US010803630B2

(12) United States Patent
Hasegawa

(10) Patent No.: US 10,803,630 B2
(45) Date of Patent: Oct. 13, 2020

(54) IMAGE PROCESSING SYSTEM, METHOD, AND PROGRAM

(71) Applicant: TOPPAN PRINTING CO., LTD., Taito-ku (JP)

(72) Inventor: Takayuki Hasegawa, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 0 days.

(21) Appl. No.: 15/843,028

(22) Filed: Dec. 15, 2017

(65) Prior Publication Data

US 2018/0108153 A1 Apr. 19, 2018

Related U.S. Application Data

(63) Continuation of application No. PCT/JP2016/002903, filed on Jun. 16, 2016.

(30) Foreign Application Priority Data

Jun. 17, 2015 (JP) ................................. 2015-122395

(51) Int. Cl.
*G06T 11/00* (2006.01)
*G06T 15/50* (2011.01)
(Continued)

(52) U.S. Cl.
CPC ............ *G06T 11/001* (2013.01); *G06F 3/013* (2013.01); *G06T 3/60* (2013.01); *G06T 15/04* (2013.01);
(Continued)

(58) Field of Classification Search
None
See application file for complete search history.

(56) References Cited

U.S. PATENT DOCUMENTS 5,717,848 A * 2/1998 Watanabe ............... G06T 13/20
345/474
6,317,126 B1 * 11/2001 Tannenbaum ........... G06T 7/42
345/421
(Continued)

FOREIGN PATENT DOCUMENTS

JP 11-175751 A 7/1999
JP 2003-132350 A 5/2003
(Continued)

OTHER PUBLICATIONS

International Search Report dated Aug. 16, 2016 in PCT/JP2016/002903, filed Jun. 16, 2016.
(Continued)

*Primary Examiner* — James A Thompson
(74) *Attorney, Agent, or Firm* — Oblon, McClelland, Maier & Neustadt, L.L.P.

(57) ABSTRACT

An image processing system includes first circuitry that controls display of an image of a space including one or more materials on a first display, and second circuitry which controls display of an image of each of the materials on a second display, controls specifying of each of the materials in the space, and controls specifying of illumination information and material information associated with a specified material. The second circuitry controls display of the image of the materials based on a specified illumination information, material information, and a relative positional relationship of a light fixture, a display surface of the second display, and a viewer.

20 Claims, 14 Drawing Sheets

(51) Int. Cl.
*G06T 15/04* (2011.01)
*G06T 19/00* (2011.01)
*G06F 3/0484* (2013.01)
*G06F 3/01* (2006.01)
*G06T 3/60* (2006.01)
*G06F 3/0482* (2013.01)

(52) U.S. Cl.
CPC ............ *G06T 15/50* (2013.01); *G06T 15/506* (2013.01); *G06T 19/00* (2013.01); *G06F 3/0482* (2013.01); *G06F 3/04845* (2013.01); *G06T 2210/04* (2013.01)

(56) References Cited

U.S. PATENT DOCUMENTS

| | | | | |
|---|---|---|---|---|
| 6,452,594 | B1* | 9/2002 | Kamen | G06T 15/04 |
| | | | | 345/426 |
| 7,224,360 | B2 | 5/2007 | Tatsumi | |
| 7,583,264 | B2* | 9/2009 | Nakagawa | G06T 15/50 |
| | | | | 345/426 |
| 9,091,528 | B2* | 7/2015 | Brooksby | G01N 21/9515 |
| 2003/0011596 | A1* | 1/2003 | Zhang | G06T 15/506 |
| | | | | 345/426 |
| 2003/0091226 | A1* | 5/2003 | Cahill | G06T 15/205 |
| | | | | 382/154 |
| 2005/0195210 | A1* | 9/2005 | Demers | G06T 15/04 |
| | | | | 345/584 |
| 2008/0158239 | A1* | 7/2008 | Lamy | G06F 3/016 |
| | | | | 345/581 |
| 2011/0227922 | A1* | 9/2011 | Shim | G06T 15/50 |
| | | | | 345/426 |
| 2012/0313955 | A1* | 12/2012 | Choukroun | G06T 19/006 |
| | | | | 345/582 |
| 2014/0063007 | A1* | 3/2014 | Grenfell | G06T 11/001 |
| | | | | 345/419 |
| 2016/0292911 | A1* | 10/2016 | Sparks | B29C 64/112 |
| 2016/0300383 | A1* | 10/2016 | Liu | G06T 7/521 |

FOREIGN PATENT DOCUMENTS

| | | |
|---|---|---|
| JP | 2004-005216 A | 1/2004 |
| JP | 2013-003848 A | 1/2013 |
| JP | 2013-182417 A | 9/2013 |

OTHER PUBLICATIONS

Supplementary Search Report dated Dec. 14, 2018, in European Patent Application No. 16811245.6-1230/3312803 PCT/JP2016002903 (11 pages).

Xiaofeng Wang, et al.; "A New Room Decoration Assistance System Based on 3D Reconstruction and Integrated Service"; Proc. of the ACM International Conference on Image and Video Retrieval, ACM, Niagara Falls, Canada; Jul. 7, 2008; 11 pages; XP058315461; DOI: 10.1145/1386352.1386443; ISBN: 978-1-60558-070-8.

* cited by examiner

IMAGE PROCESSING SYSTEM, METHOD, AND PROGRAM

CROSS-REFERENCE TO RELATED APPLICATIONS

The present application is a continuation of International Application No. PCT/JP2016/002903, filed Jun. 16, 2016, which is based upon and claims the benefits of priority to Japanese Application No. 2015-122395, filed Jun. 17, 2015. The entire contents of these applications are incorporated herein by reference.

BACKGROUND OF THE INVENTION

Field of the Invention

The present invention relates to an image processing system, method, and program, and more particularly, to an image processing system, method, and program for displaying the texture of the material of a displayed object.

Discussion of the Background

Thanks to the recent development in manufacturing technology, communication technology, and information processing technology, mobile terminals such as smart phones and tablet terminals are used in various situations. Situations where composite mobile terminals including various functions such as GPS, a gyro sensor, and a camera in addition to a touch panel display and a communication interface are used are expected to expand further in the future.

For example, conventionally, products subject to commercial transactions have been introduced by presenting them in pictures and illustrations on paper brochures. Products such as interior and exterior decoration materials whose material texture is difficult to perceive from pictures and illustrations (color samples) have been introduced in the form of sample collections including small pieces of the real products.

A method and device have been proposed for displaying the texture of a subject (material) such as the gloss of the surface of the subject or the fine texture of a woven fabric (see, for example, PTL 1). PTL 1 discloses, regarding a still subject having different states of specular reflection, obtaining a plurality of original images of the still subject changing at least one of a position and a direction of illumination of a light source to illuminate the still subject, creating a plurality of frame images of the still subject based on the plurality of original images, sequentially switching the frame images to display the still subject, and forming image signals of the frame images by generating gloss signals using specular reflection image signals and diffuse reflection image signals of the subject and carrying out window processing on the gloss signals.

Further, practical application of a technique that changes the texture of a material by adding depth to a still image by applying, for example, the parallax effect is in progress.

People considering purchasing housing such as condominiums can experience the actual layouts and the material textures of the decorative materials by going to showrooms. It is known to reproduce house specifications including layouts and the like with computer graphics (CG) (see, for example, PTL 2). Through virtual showrooms provided by the home supplier, the person wishing to purchase a house can experience simulations of the housing specifications including layouts and the like.

PTL 1: JP 2003-132350 A (see Abstract, Claims 1, 2, etc.)
PTL 2: JP 2004-5216 A (see para. 0037, FIG. 3)

SUMMARY OF THE INVENTION

According to an aspect of the present invention, an image processing system includes first circuitry that controls display of an image of a space including one or more materials on a first display, and second circuitry which controls display of an image of each of the materials on a second display, controls specifying of each of the materials in the space, and controls specifying of illumination information and material information associated with a specified material. The second circuitry controls display of the image of the materials based on a specified illumination information, material information, and a relative positional relationship of a light fixture, a display surface of the second display, and a viewer.

According to another aspect of the present invention, a method of processing an image includes displaying an image of a space including one or more materials on a first display, specifying each of the materials in the space, specifying illumination information and material information associated with a specified material, and displaying an image of the materials on a second display based on a specified illumination information, the material information, and a relative positional relationship of a light fixture, a display surface of the second display, and a viewer.

According to another aspect of the present invention, a non-transitory computer-readable medium includes computer executable instructions, wherein the instructions, when executed by a computer, cause the computer to perform a method of processing an image, including displaying an image of a space including one or more materials on a first display, specifying each of the materials in the space, specifying illumination information and material information associated with a specified material; and displaying an image of the materials on a second display based on a specified illumination information, the material information, and a relative positional relationship of a light fixture, a display surface of the second display, and a viewer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
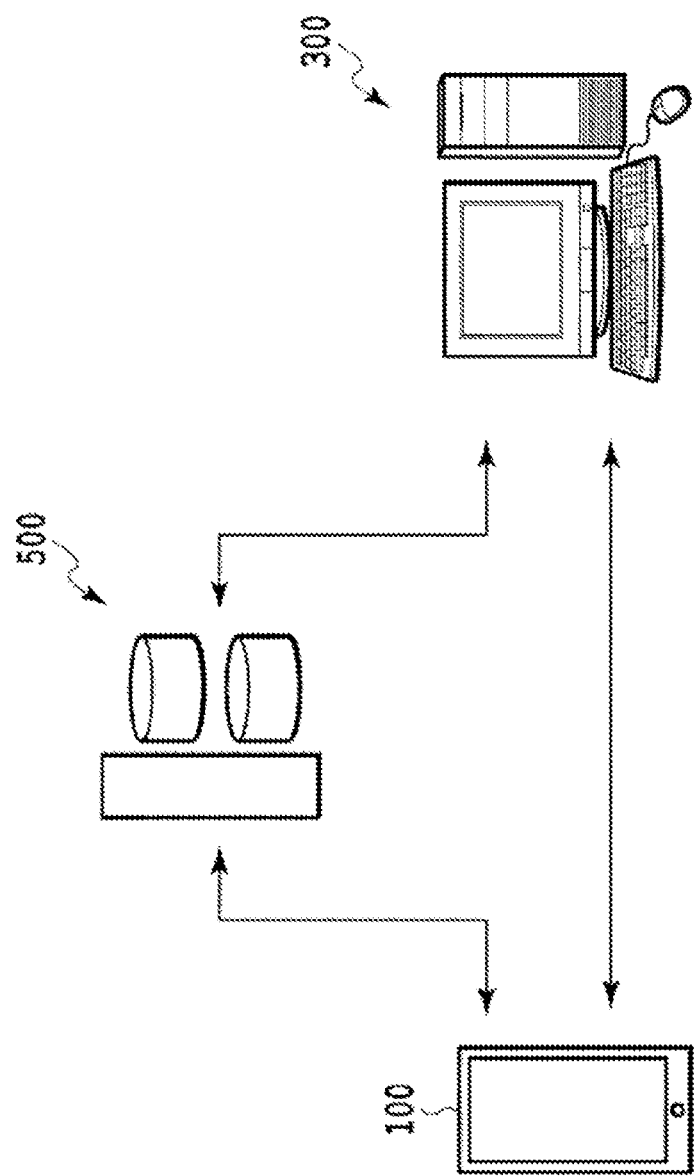
FIG. 1 is a schematic diagram of an image processing system according to an embodiment of the present invention.

The embodiments will now be described with reference to the accompanying drawings, wherein like reference numerals designate corresponding or identical elements throughout the various drawings.

Embodiments of the present invention will be described in detail with reference to the drawings. The image processing system, method, and program described below are suitable for an electronic sample book of interior and exterior decoration materials used in indoor and outdoor spaces of houses and the like. That is, an image processing system, method, and program according to the present embodiment enable displaying the texture of a decorative material in accordance with a change in the observation environment or a change in the orientation of the decorative material, and could become an alternative to a sample collection including pieces of the real products or a mere color sample.

The present invention is not limited to decorative materials. It can be implemented in other examples without losing generality. For example, indoor/outdoor spaces such as houses can be generalized to spaces including the inside and outside spaces of vehicles such as cars, trains, ships, and airplanes. Decorative materials include flooring materials (boards, carpets, stones, tiles), inner wall materials (boards, cloths (leather, synthetic leather, paper, synthetic resin, decorative sheets, etc.)), outer wall materials (siding materials (board materials, stone materials, tile materials, etc.)), and ceiling materials (boards, cloths (leather, synthetic leather, paper, synthetic resin, decorative sheets, etc.)), but they can be generalized to "materials" including interior decoration materials (leather, synthetic leather, cloth, synthetic resin, decorative sheets, etc.) and exterior decoration materials of vehicles and the like.

FIG. 1 is a diagram showing the configuration of an image processing system. The image processing system includes an image processing device 100 and a virtual space image processing device 300. The image processing system may include a server 500 configured to provide various data and/or services to the image processing device 100 and the virtual space image processing device 300.

Figure 2:
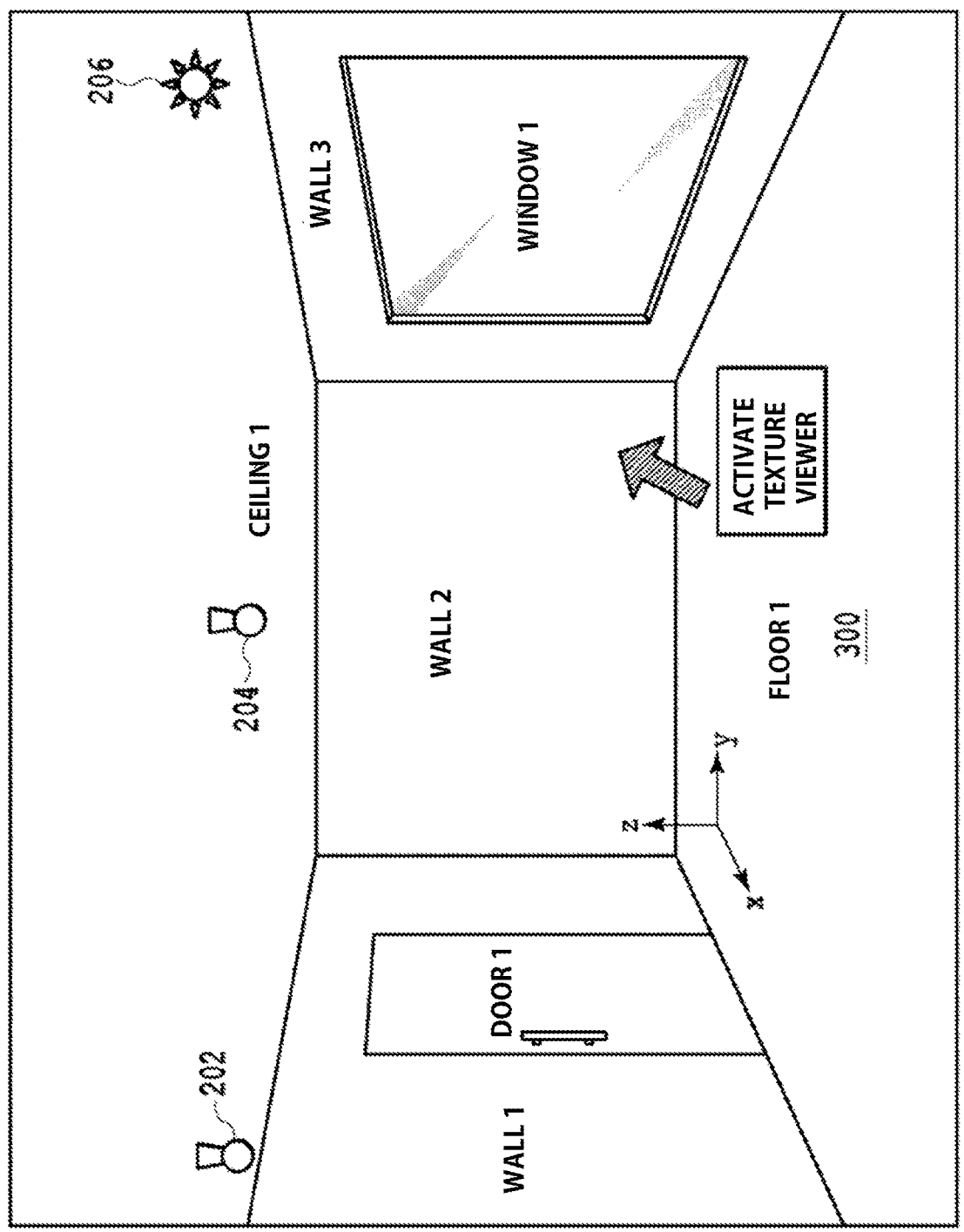
FIG. 2 is a diagram illustrating a space displayed by an image processing system according to an embodiment of the present invention.

FIG. 2 shows an example of a virtual space displayed on a monitor (a display device or the like) which the virtual space image processing device 300 includes. Information on the virtual space includes information on the layout of the walls, floor, ceiling, doors, windows, light fixtures, and the like. Virtual space information is stored in a space information storage unit 308 of the virtual space image processing device 300 and is used when a rendering unit 304 of the virtual space image processing device 300 generates display data. Virtual space information may be created in the virtual space image processing device 300 and stored in the space information storage unit 308, or acquired from the server 500 and stored in the space information storage unit 308.

The virtual space shown in FIG. 2 includes various parts (walls 1 to 3, floor 1, ceiling 1, door 1, window 1, light fixtures 1, 2) constituting the layout of the space. The virtual space information which is information on the virtual space includes information for identifying the various parts and information for identifying the positions of the various parts in the virtual space. In addition, information on the light in the virtual space (direction, color components, and intensity of light) is defined as illumination information. The information for identifying the various parts makes it possible to identify the types of parts (wall, floor, ceiling, door, etc.). The information for identifying the positions makes it possible to calculate the location of each part in the virtual space, the boundary, distance, and relative positional relationship with respect to other parts. The way of selecting (determining) the materials of the various parts will be described later. When generating the display data of the virtual space, information on the materials of the various parts (material information: including various characteristic information on the material) and illumination information on the light from each of the light sources 202, 204, and 206 (light fixtures 1 and 2 and the sun) are taken into consideration.

For example, a person wishing to purchase a house can designate materials (that is, parts (walls 1 to 3, floor 1, ceiling 1, etc.)) whose texture he or she wants to view using the displayed virtual space. The virtual space image processing device 300 can process, as the designated part, a part located at a position in the virtual space corresponding to the position that has been clicked on the display unit 302 in the virtual space image processing device 300. Alternatively, the virtual space image processing device 300 may process, as the designated part, a part to which the eyes of the viewer in the virtual space have approached (that is, when the distance between the viewer's eyes and the part in the virtual space has become equal to or less than a threshold). The image processing device 100 can display the texture of the material of the part specified by the virtual space image processing device 300. Therefore, a person wishing to purchase a house can view a more detailed change in the appearance (texture) of the designated part.

Figure 3:
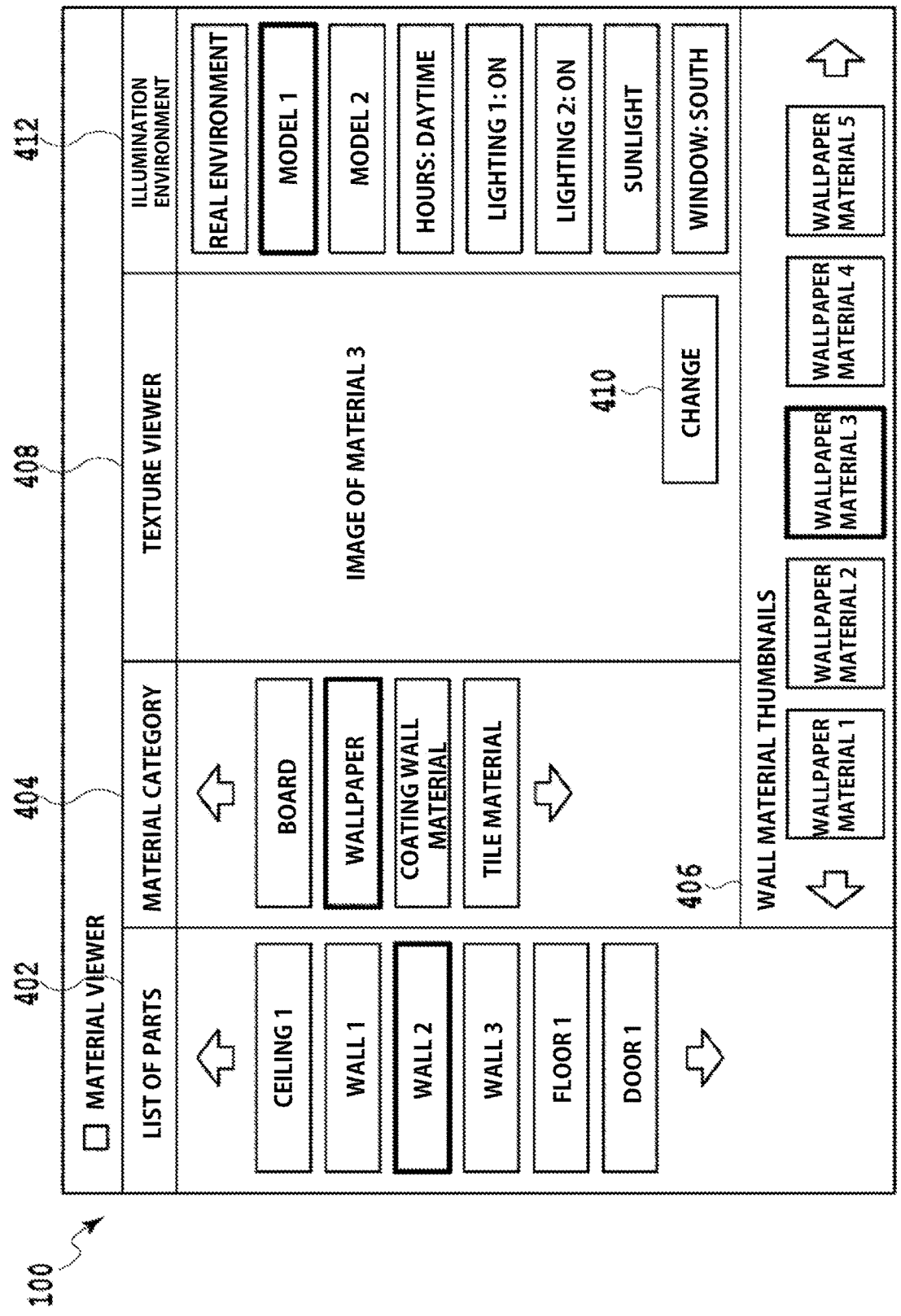
FIG. 3 is a diagram illustrating a user interface of an image processing system according to an embodiment of the present invention.

FIG. 3 is a diagram illustrating an example of a user interface (material viewer) provided by the image processing device 100 when selecting the materials of the various parts in the virtual space. For instance, a person wishing to purchase a house can view the texture of the material of the part specified by the virtual space image processing device 300 using the user interface shown in FIG. 3. Further, a person wishing to purchase a house can change the target to another material and view the texture of the material using the user interface shown in FIG. 3. The virtual space image processing device 300 generates and displays the display information of the virtual space to which the material changed using the user interface of FIG. 3 is applied. Thus, a person wishing to purchase a house not only can view the texture of the material of a part by specifying the part whose texture the user wishes to view in more detail in the virtual space, but also can view the texture of another material and apply the other material to the virtual space.

The image processing device 100 and the virtual space image processing device 300 share information on the virtual space. For example, as shown in FIG. 3, the user interface (material viewer) includes a parts list 402 that enables selection of various parts of the virtual space (FIG. 2). The user interface includes a list (material category list) 404 that enables selection of categories of materials applicable to the parts selected from the parts list. Further, the user interface includes a list (thumbnail list) 406 of thumbnails of the materials classified into categories selected from the material category list. The user interface also includes a texture viewer area 408 for displaying an image of the material selected from the thumbnail list. Furthermore, the user interface includes an illumination environment list 412 that enables selection of illumination information (models 1, 2, . . . ) of various illumination environments modeled for the virtual space. The illumination environment list may include the illumination information of the real environment in which the image processing device 100 is present in addition to the illumination information of the virtual space. The illumination environment list may include an outline (hours, light source type/state, whether a window is present) of the modeled illumination information. In the texture viewer area 408, an image taking account of the material information (color characteristics, shape characteristics, reflection characteristics) of the selected material and the illumination information (the direction, color components, and intensity of light) is displayed. The texture viewer area 408 may be configured to occupy the entire display area of the display. As will be described below, the image processing device 100 renders and displays the image of the material taking into consideration the inclination of the image processing device (tablet terminal) (the orientation of the display surface). Thus, the viewer can observe the image of the material and experience the texture of the material as if the material is in hand.

Figure 4:
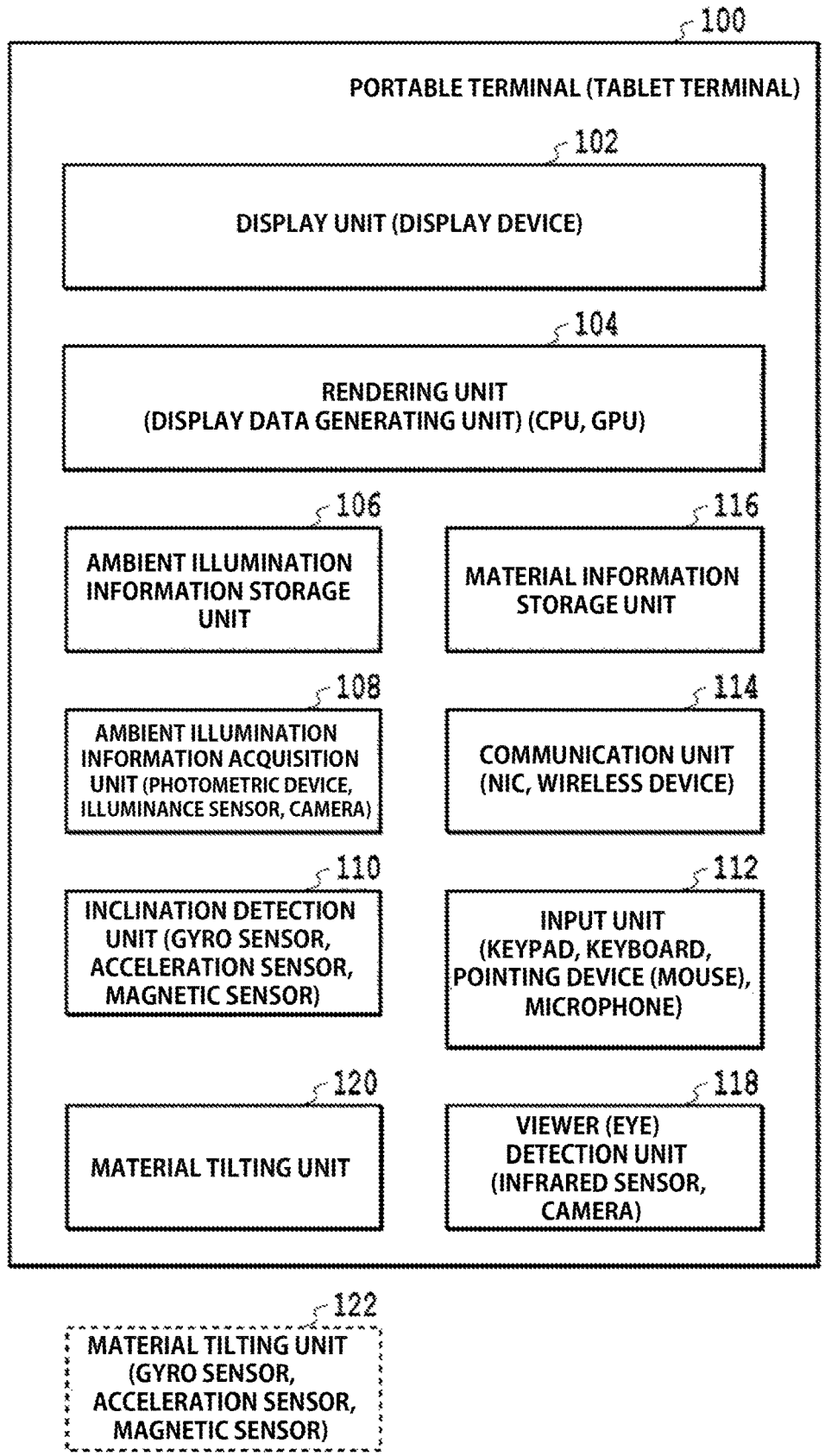
FIG. 4 is a functional block diagram of an image processing device of an image processing system according to one embodiment of the present invention.

FIG. 4 is a functional block diagram of a portable terminal which is an embodiment of the image processing device according to the present invention. The portable terminal 100 in FIG. 4 is, for example, a tablet terminal, and includes a display, a processor, a memory, and various sensors. The portable terminal 100 may include a communication device, a keyboard, a pointing device including a computer mouse, and an input device such as a microphone. The input device constitutes an input unit 112.

The display device can be any display device suitable for displaying an image, and preferably, without limitation, it is a touch display device of an electromagnetic induction type, a capacitive type, or a pressure sensitive type. The display device constitutes a display unit 102. An electromagnetic induction, capacitive, or pressure sensitive touch display device constitutes the display unit 102 and input unit 112.

The processor may include not only a CPU but also a GPU and/or a coprocessor. The processor generates display data corresponding to the image displayed on the display unit. The processor constitutes a rendering unit (display data generating unit) 104.

The memory may be either a magnetic drive such as an HDD or a semiconductor drive such as an SSD. The memory may be a built-in type or an external type. The memory constitutes an ambient illumination information storage unit 106 and a material information storage unit 116. The memory may also store information on the inclination of the tablet terminal (the orientation of the display surface) detected by an inclination detection unit 110.

The various sensors may be any device suitable for acquiring illumination information around the tablet terminal (ambient illumination information) (hereinafter referred to as an ambient illumination information acquisition device) and any device suitable for detecting the inclination of the tablet terminal (inclination detection device). For example, the ambient illumination information acquisition device may be one or more of a photometric device, an illuminance sensor, and a camera. The ambient illumination information acquisition device may be a built-in type or an external type. Further, for example, the inclination detection device can be one or more of a gyro sensor, an acceleration sensor, and a magnetic sensor. The ambient illumination information acquisition device constitutes an ambient illumination information acquisition unit 108 together with the processor or by itself. Further, the inclination detection device constitutes the inclination detection unit 110 together with the processor or by itself. In addition, the various sensors may include a device suitable for detecting the position of the viewer (for example, the viewer's eyes). Such a device may be one or more of an infrared sensor and camera.

For example, a camera as an ambient illumination information acquisition device may be an omnidirectional camera, and the color and brightness of the omnidirectional image obtained by capturing the overall surroundings of the tablet terminal with such a camera may be used as the illumination information (ambient illumination information) of the real environment. Alternatively, whether it is a built-in camera or an external camera, a reference image acquired with the camera placed on a horizontal plane may be combined (connected) with images of the overall surroundings of the tablet terminal acquired separately changing the orientation of the camera so as to form an omnidirectional image, and the color or brightness of the generated omnidirectional image can be used as the illumination information (ambient illumination information) of the real environment. When the dynamic range (latitude) of the image sensor of the camera is narrower than the luminance range of the luminance distribution of the real environment around the tablet terminal, an image acquisition technique which synthesizes images shot varying the exposure amount in multiple stages (high dynamic range imaging: HDR) may also be used.

For example, the position of the face (eyes) of the operator (viewer) of the tablet terminal can be identified from the image captured by a built-in camera of the tablet terminal (or an external camera whose relative positional relationship with the tablet terminal is already known), and then the relative positional relationship between the display surface of the tablet terminal and the viewer can be determined. The relative positional relationship between the display surface of the tablet terminal and the viewer can be identified in real time by repeating the image acquisition and the determination of the position of the face (eyes) of the viewer at a short time interval.

The communication device may be one or more of a bus (for example, USB (Universal Serial Bus)) interface for connection with an external device, a network interface card (NIC) for wired communication, and a wireless device for wireless communication. The communication device constitutes a communication unit 114. The tablet terminal 100 may acquire illumination information (illumination information modeled for the virtual space (spatial illumination information)) and material information from the outside (the virtual space image processing device 300 or the server 500) via the communication unit 114. The externally acquired illumination information can be used as an alternative to the ambient illumination information (the illumination information of the real space).

The ambient illumination information storage unit 106 stores ambient illumination information acquired by the ambient illumination information acquisition unit 108 or spatial illumination information acquired from the outside via the communication unit 114.

The material information storage unit 116 stores material information acquired from the outside via the communication unit 114. The material information is information on the texture of the material. The material information includes normal line information for each pixel (shape characteristics: information indicating the orientation of the pixel face at the decorative material (floor material, wall material, ceiling material); for example, it is the normal vector information for each pixel). In addition, the material information includes RGB information (color characteristics: information indicating the base color of the material) for each pixel, information on the gloss intensity of each pixel, and information on the gloss sharpness (reflection characteristics). Information on the gloss intensity may be information on the intensity of each RGB of each pixel. Display data is generated based on the ambient illumination information (or spatial illumination information acquired from the outside) and material information. As a result, the texture of the material (glossiness, roughness, unevenness) is displayed.

The tablet terminal 100 can display the material of a part in the virtual space specified by the virtual space image processing device 300. As described earlier, the viewer can designate materials (that is, parts (walls 1 to 3, floor 1, ceiling 1, etc.)) whose texture he or she wants to view via the user interface (UI) of the virtual space image processing device 300. The tablet terminal 100 can receive information for identifying the designated part and material from the virtual space image processing device 300 and display the material on the display.

Further, the tablet terminal 100 includes a UI providing unit (not shown) that provides a user interface (UI) for interaction with a viewer (for example, the material viewer in FIG. 3). As described above, the viewer can select the material to be displayed through the UI. That is, the tablet terminal 100 can receive the selection of material from the viewer via the UI and display the material on the display. The UI may include a hierarchically categorized menu (material categories) that enables the viewer to select the material to be displayed. For example, the materials may be classified into categories such as wall materials, floor materials, and ceiling materials, so that the viewer can select the material following the category hierarchy. In the subcategories, thumbnails of a plurality of materials may be presented so that the viewer can select the materials to be displayed.

Figure 5:
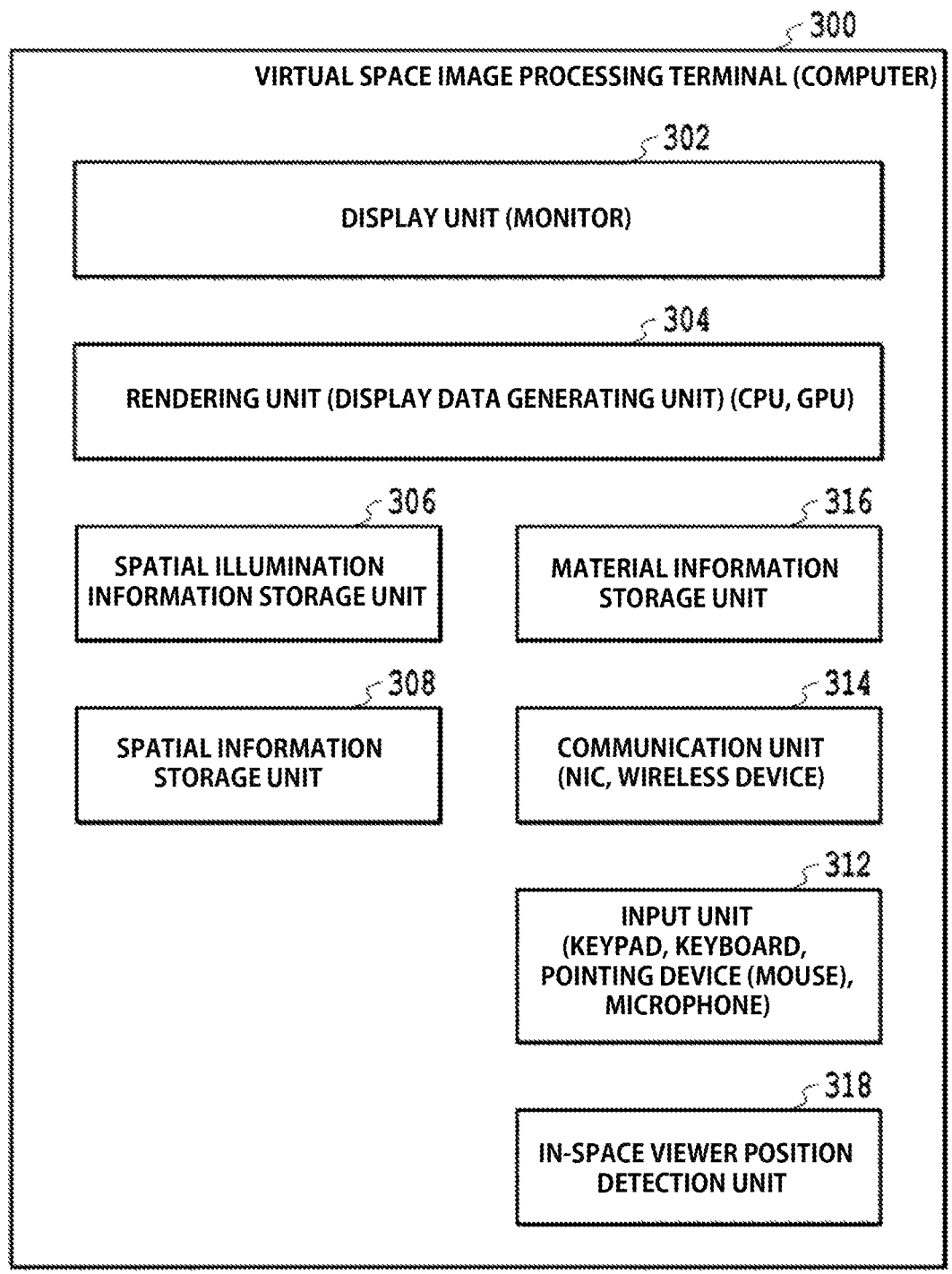
FIG. 5 is a functional block diagram of a virtual space image processing device of an image processing system according to one embodiment of the present invention.

FIG. 5 is a functional block diagram of the virtual space image processing device 300 of an image processing system according to one embodiment of the present invention. The virtual space image processing device 300 is a computer suitable for rendering and displaying a virtual space image, and includes a monitor, a processor, and a memory. The computer constituting the virtual space image processing device 300 may include a communication device, a keyboard, a pointing device including a computer mouse, and an input device such as a microphone. The input device constitutes an input unit 312.

The monitor may be any display device suitable for displaying an image of the virtual space, and constitutes a display unit 302.

The processor may include not only a CPU but also a GPU and/or a coprocessor. The processor generates display data corresponding to the image displayed on the display unit. The processor constitutes a rendering unit (display data generating unit) 304. Further, the processor constitutes an in-space viewer position detection unit 318 that detects the position of a viewer (for example, the eyes (viewpoint) or a camera) in the virtual space together with the input device or by itself.

The memory may be either a magnetic drive such as an HDD or a semiconductor drive such as an SSD. The memory may be a built-in type or an external type. The memory constitutes a spatial illumination information storage unit 306, a spatial information storage unit 308, and a material information storage unit 316.

The communication device may be one or more of a bus (for example, USB (Universal Serial Bus)) interface for connection with an external device, a network interface card (NIC) for wired communication, and a wireless device for wireless communication. The communication device constitutes a communication unit 314. The computer 300 constituting the virtual space image processing device can exchange spatial information, spatial illumination information, and material information with the outside (the portable terminal 100 or the server 500) via the communication unit 314. The spatial illumination information storage unit 306 stores the spatial illumination information. The material information storage unit 316 stores the material information. The spatial information storage unit 308 stores the spatial information.

The rendering unit (display data generating unit) 304 and the in-space viewer position detecting unit 318 of the virtual space image processing device 300 may be implemented in the server 500. When these functions are implemented in the server 500, the virtual space image processing device 300 can receive the display data of the space rendered by the server 500 via the communication unit 314 and display it on the display unit 302.

Figure 6:
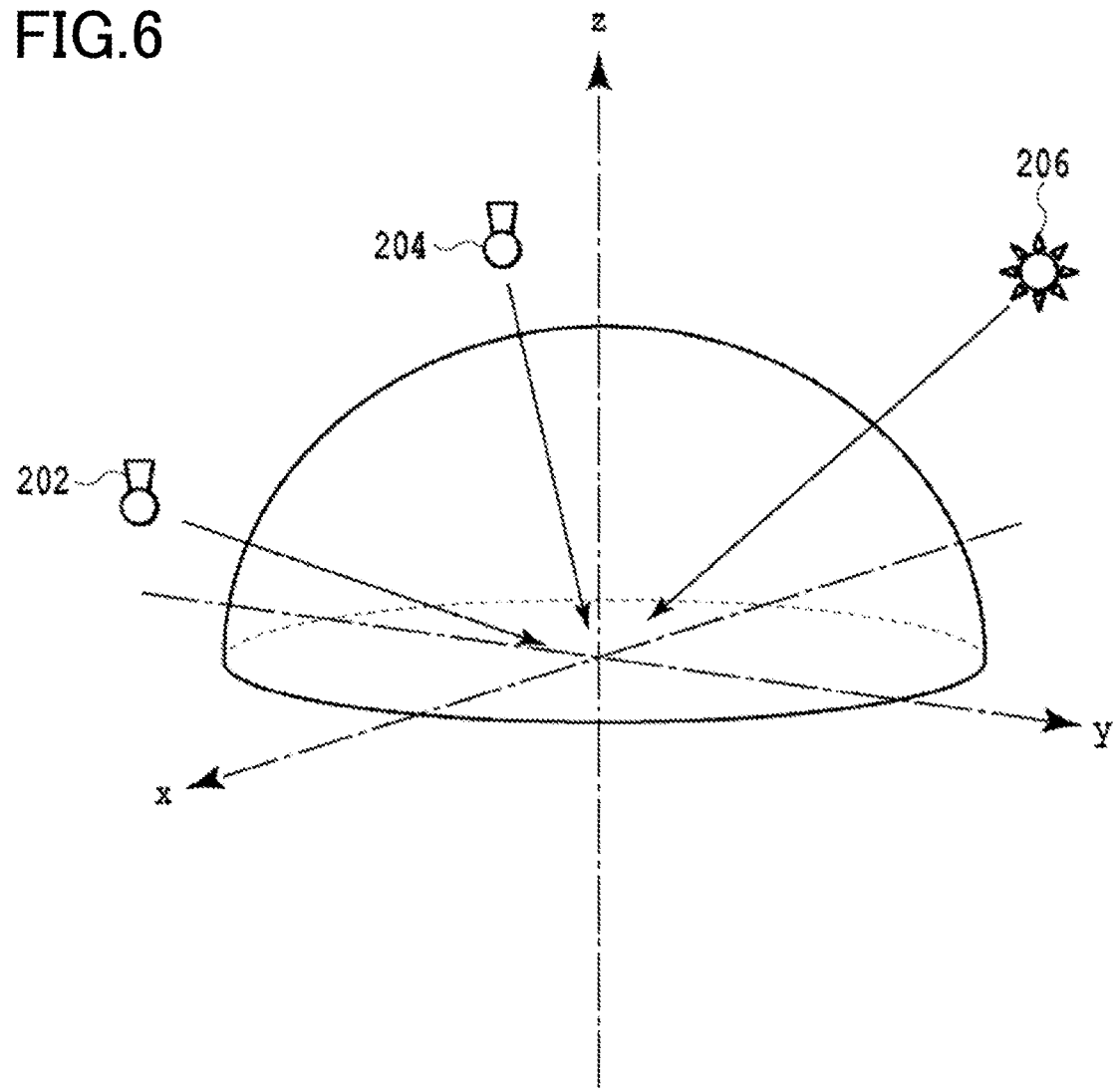
FIG. 6 is a diagram for describing an embodiment of the present invention.

FIG. 6 shows a space in which the ambient illumination information is acquired by the ambient illumination information acquiring unit 108. In FIG. 6, the x-axis and the y-axis are orthogonal to each other in a horizontal plane, and the z-axis is an axis orthogonal to the horizontal plane. In the space of FIG. 6, a total of three light sources are shown, including two electric lamps 202 and 204 and the sun 206. With the intersection of the x-axis, the y-axis, and the z-axis being the position of the ambient illumination information acquisition unit 108, light from the three light sources of the two electric lamps 202 and 204 and the sun 206 is observed, and the direction, color components, and intensity (luminance) of the light observed for each light source are obtained as the ambient illumination information in the space. The number of light sources is not limited to three. The light source is not limited to a light emitting object, and may be a reflector that reflects light towards the ambient illumination information acquisition unit 108. The ambient illumination information (the direction, color components, and intensity of light) of all of the light sources observed in the space may be acquired. The obtained ambient illumination information is stored in the ambient illumination information storage unit 106.

As an alternative to the ambient illumination information, it is possible to acquire spatial illumination information from the outside via the communication unit 114. The spatial illumination information and ambient illumination information are simply referred to as illumination information. The spatial illumination information may be information on the illumination in a modeled space such as a room with a south-facing window (a window through which sunlight enters) and four down lights, or a bedroom without a window but with one electric lamp (information of illumination stored in advance in an external virtual space image processing device 300, server 500, or the like). The modeled space may be one or more spaces within a layout of a showroom of a building being sold/planned to be built. That is, since the material can be displayed on the tablet terminal 100 taking account of the illumination information in the virtual space, the viewer can experience a simulation of the texture when the material is viewed in the virtual space. For example, the direction and brightness of the illumination at the position clicked to designate the part whose texture is desired to be viewed may be used (that is, the position in the virtual space corresponding to the clicked position on the display unit 302 of the virtual space image processing device 300). Alternatively, it is also possible to use the direction and brightness of the illumination at a certain position in the part (such as the center of the part) whose texture is desired to be viewed. Further, in accordance with the position indicated on the display unit 102 of the tablet terminal 100 (for example, the position traced with a finger), the material may be displayed as if it is being illuminated with a flashlight. In this case, for example, new illumination information (illumination information of the flashlight) is added to the position in the virtual space corresponding to the position indicated on the display unit 102.

Figure 7:
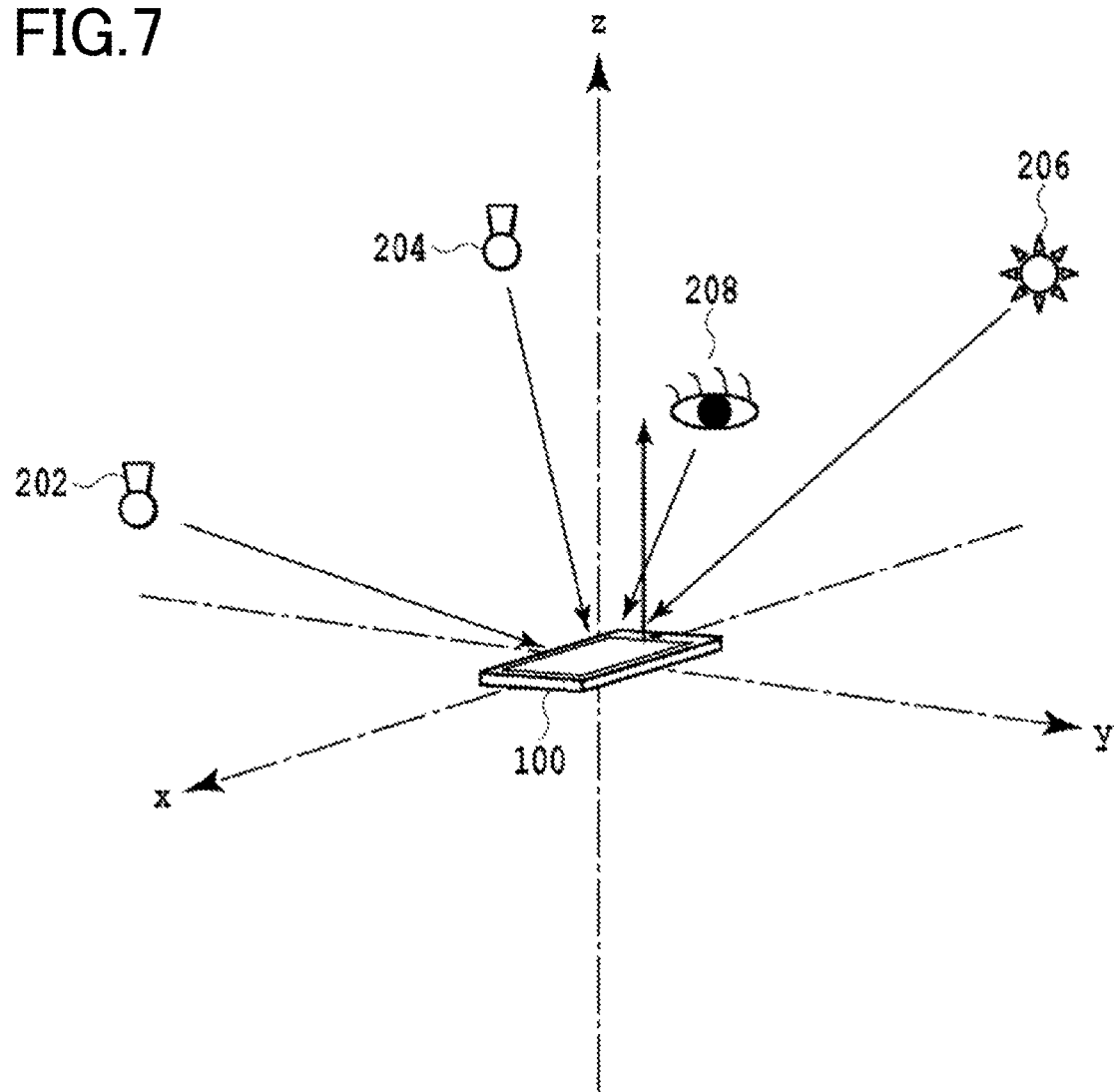
FIG. 7 is a diagram for describing an embodiment of the present invention.

FIG. 7 shows a state in which the tablet terminal 100 is placed in the space shown in FIG. 6. FIG. 7 also shows an eye 208 of the viewer of the image displayed by the tablet terminal 100. The tablet terminal 100 is placed at the intersection of the x-axis, the y-axis, and the z-axis so that the display surface faces upward and the display surface is parallel to the xy plane. The direction of the eye 208 may be a direction relative to the normal of the display surface detected by the viewer detection unit 118, or a predetermined direction with respect to the normal of the display surface (not detected by the viewer detection unit 118).

In the state shown in FIG. 7, the rendering unit 104 generates display data of the material as if the surface of the material is overlaid on the display surface. When the generated display data is displayed on the display device, the viewer holding the tablet terminal 100 can observe the texture of the material as if he or she is holding the material with his or her own hand.

The rendering unit 104 reads out the material information of the material to be rendered from the material information storage unit 116 (normal information (shape characteristics), RGB information (color characteristics), gloss intensity information, and gloss sharpness information for each pixel), reads out the illumination information from the ambient illumination information storage unit 106 (the direction, color components, and intensity (luminance) of the light from one or more light sources), and generates the display data by calculating the color components and intensity (luminance) of each pixel reflected in the direction of the viewer. Using the generated display data, an image is displayed on the display unit. In the state shown in FIG. 7, the color components and intensity (luminance) of the light entering from the three light sources (two lamps 202 and 204 and the sun 206) on the surface of the material and reflecting in the direction of the eye 208 are calculated.

Figure 8:
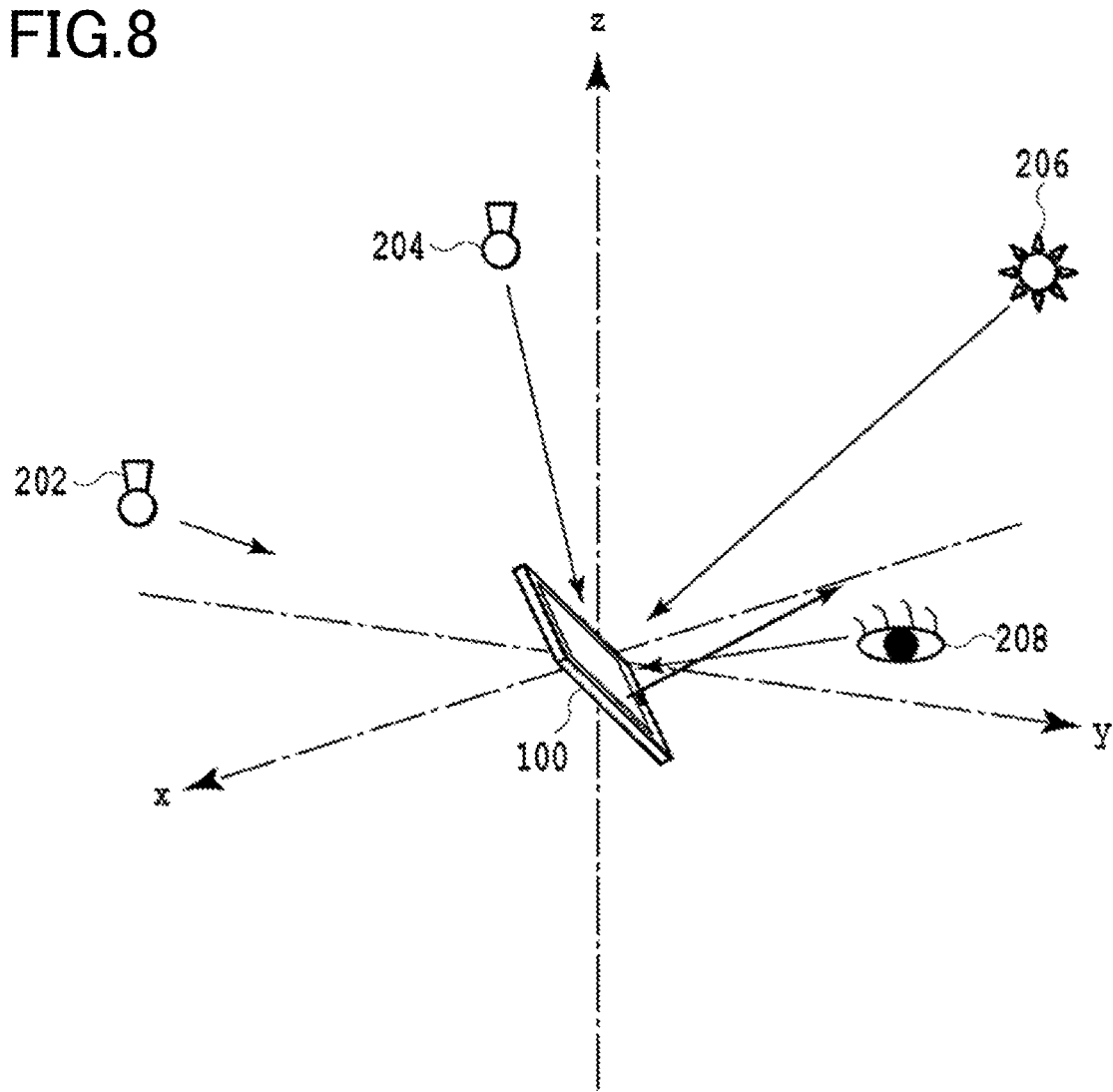
FIG. 8 is a diagram for describing an embodiment of the present invention.

In the state shown in FIG. 8, the display surface of the tablet terminal 100 is inclined from the horizontal plane (xy plane). The degree of inclination is such that the light of the electric lamp 202 does not enter the display surface. The inclination detection unit 110 detects this inclination, and the rendering unit 104 takes into consideration the detected inclination when generating the display data. That is, the rendering unit 104 calculates the color components and intensity (luminance) of the light entering from the two light sources (one lamp 204 and the sun 206) on the surface of the material and reflecting in the direction of the eye 208 and generates the display data.

Figure 9:
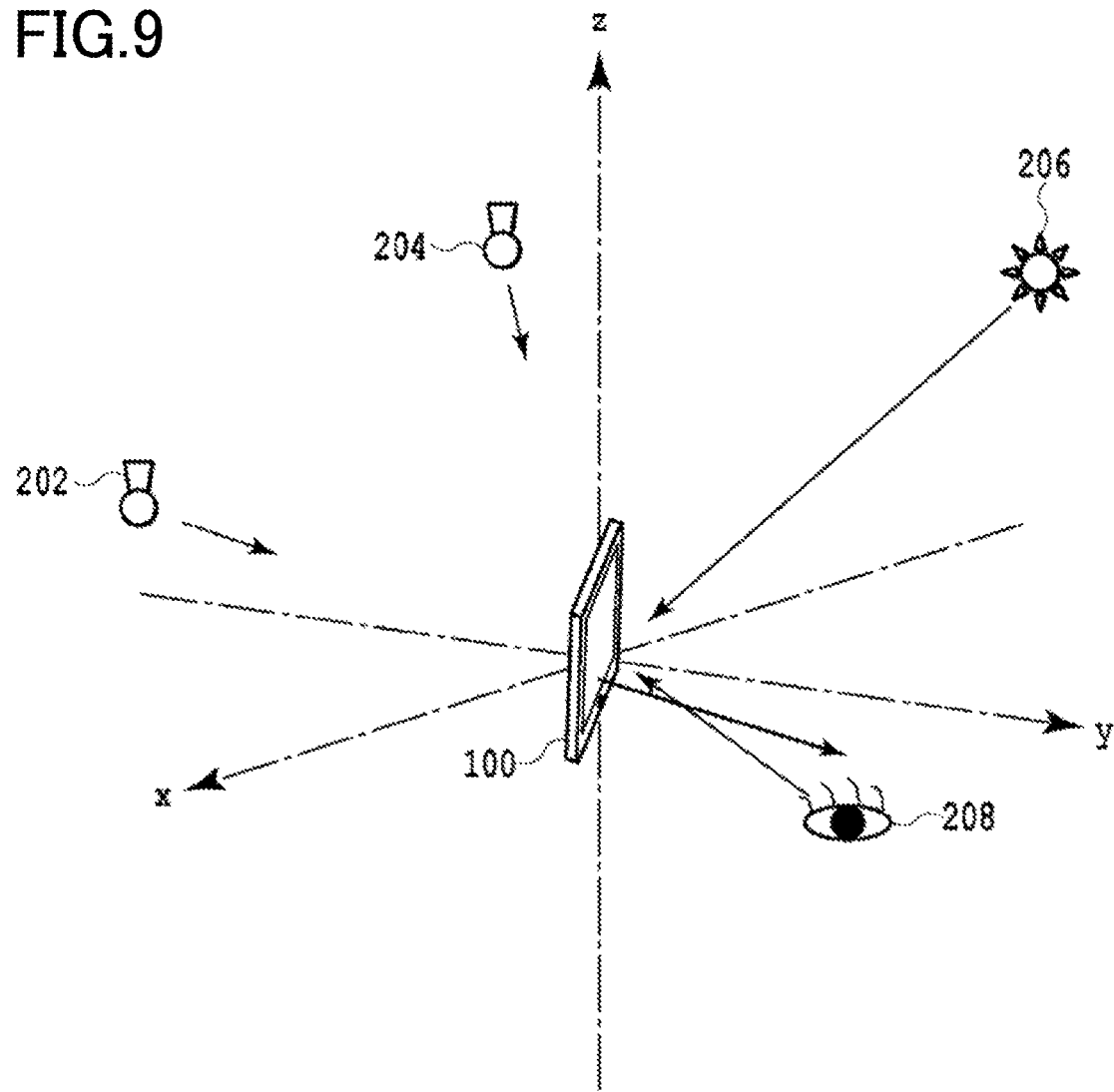
FIG. 9 is a diagram for describing an embodiment of the present invention.

Further, in the state shown in FIG. 9, the display surface of the tablet terminal 100 is disposed parallel to the z-axis. In this orientation, the light of the two electric lamps 202 and 204 does not enter the display surface. The inclination detection unit 110 detects the inclination of the tablet terminal 100 at this time, and the rendering unit 104 takes into consideration the detected inclination when generating the display data. That is, the rendering unit 104 calculates the color components and intensity (luminance) of the light entering from only the one light source (the sun 206) on the surface of the material and reflecting in the direction of the eye 208 and generates the display data.

As described with reference to FIGS. 7 to 9, the display data generated by the rendering unit 104 takes account of the inclination of the tablet terminal 100 (the orientation of the display surface) and the position (the direction) of the eye. Thus, tilting the tablet terminal 100 or changing the position (the direction) of the eye, the viewer holding the tablet terminal 100 can view the texture of the material in the same way as when viewing the real material.

The rendering unit 104 can also have a zoom function. As described above, the rendering unit 104 generates the display data of the material as if the surface of the material is overlaid on the display surface. The distance between the display surface and the viewer holding the tablet terminal 100 is substantially the length of the arm of the viewer and does not change significantly. Accordingly, it is useful that the rendering unit 104 is implemented with a zoom function that generates the display data of the material as if the material is placed between the display surface and the viewer in response to a zoom-in instruction from the viewer received via the user interface (UI), or generates the display data of the material as if the display surface is placed between the material and the viewer (the material is placed behind the display surface) in response to a zoom-out instruction received via the UI. For example, when the viewer holds the tablet terminal so that the display surface is perpendicular to the horizontal plane to tilt the material of a wall material, the viewer may use the zoom-out function to view the texture of the material on the assumption that the wall is 2 to 3 m away.

Figure 10:
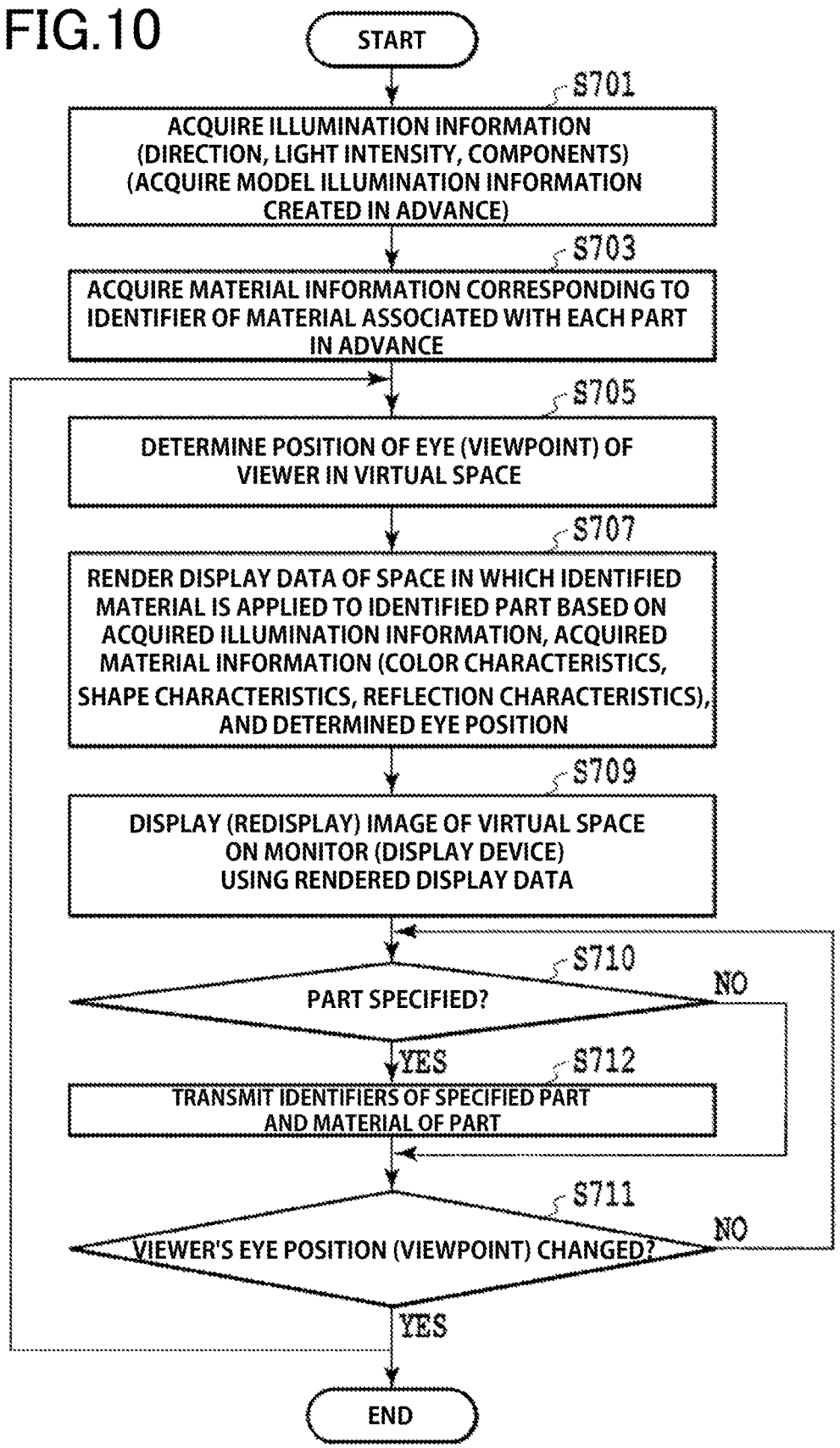
FIG. 10 is a flowchart of the process executed by a virtual space image processing device of an image processing system according to one embodiment of the present invention.

FIG. 10 is a flowchart of the process executed by the virtual space image processing device.

At step S701, the virtual space image processing device 300 (the rendering unit 304) acquires virtual space illumination information. The illumination information (spatial illumination information) of the modeled space stored in advance in the spatial illumination information storage unit 306 is acquired. The spatial illumination information may be spatial illumination information acquired from the server 500 or the portable terminal 100 via the communication unit 314 and stored in the spatial illumination information storage unit 306.

At step S703, the virtual space image processing device 300 (the rendering unit 304) acquires material information corresponding to the identifier of the material associated with each part in advance. Alternatively, it receives the identifier of the part or the identifier of the material applied to the part from the portable terminal 100, and in response thereto, acquires the material information (color characteristics, shape characteristics, reflection characteristics) of the material. Material information stored in advance in the material information storage unit 316 is acquired. The material information may be material information acquired from the server 500 or the portable terminal 100 via the communication unit 314 and stored in the material information storage unit 316. The material information is information indicating the above-described color characteristics, shape characteristics, and reflection characteristics.

At step S705, the virtual space image processing device 300 (viewer position detection unit 318) determines the position of the viewer's eye (viewpoint or camera position) in the virtual space.

At step S707, the virtual space image processing device 300 (the rendering unit 304) renders the display data of the space in which the identified material is placed (virtual space). The rendering of the display data of the space is based on the obtained illumination information and material information, and the position of the viewer's eye in the determined virtual space.

At step S709, the virtual space image processing device 300 (the display unit 302) displays (redisplays) the image of the space (virtual space) using the display data.

At step S710, the virtual space image processing device 300 determines whether a part whose texture is desired to be viewed has been designated. If so, the process advances to step S712, and if not, the process advances to step S711.

At step S712, the virtual space image processing device 300 transmits the identifiers of the part designated at step S710 and the material of the part.

At step S711, it is determined whether the viewer's eye position (viewpoint) in the virtual space has been changed (whether the virtual space has been rotated or whether it has been scaled up or down). If the viewer's eye position (viewpoint) has been changed, the process returns to step S705 to carry out the rendering of the display data of the space (virtual space) again and redisplay the image (step S709), and if there has been no change, the process returns to step S710.

Figure 11:
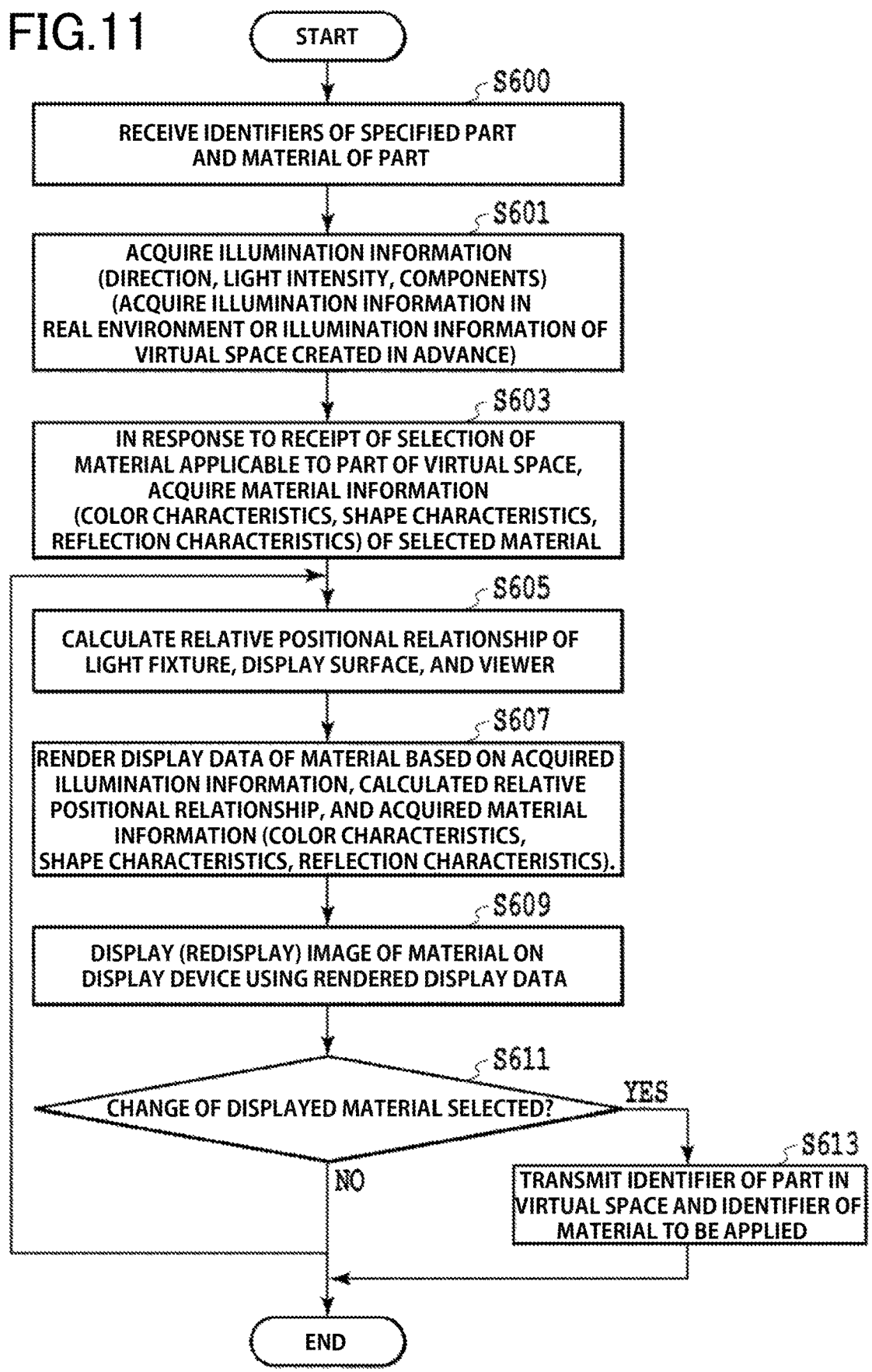
FIG. 11 is a flowchart of the process executed by an image processing device of an image processing system according to one embodiment of the present invention.

FIG. 11 is a flowchart of the process executed by the image processing device, which is an example of the process executed by the above-described portable terminal 100.

At step S600, the portable terminal 100 receives from the virtual space image processing device 300 the identifiers of the designated part and the material of the part.

At step S601, the portable terminal 100 (the rendering unit 104) acquires ambient illumination information. The illumination information acquired by the ambient illumination information acquisition unit 108 in the real environment in which the portable terminal is placed, or the illumination information stored in the ambient illumination information storage unit 106 is acquired. Alternatively, the external illumination information in the modeled space acquired through the communication unit 114 or the external illumination information acquired through the communication unit 114 and stored in the ambient illumination information storage unit 106 is acquired.

At step S603, the portable terminal 100 (the rendering unit 104) acquires the material information of the material to be displayed (color characteristics, shape characteristics, reflection characteristics). The material information acquired from the outside via the communication unit 114 and stored in the material information storage unit 116 is acquired. For example, the color characteristics are RGB information for each pixel of the material, the shape characteristics are normal vector information for each pixel of the material, and the reflection characteristics are gloss intensity information and gloss sharpness information for each pixel.

At step S605, the portable terminal 100 (the rendering unit 104) determines the relative positional relationship between the display surface and the viewer. The portable terminal 100 (the rendering unit 104) can determine the relative positional relationship of the light fixtures, the display surface, and the viewer by a calculation using the direction of light included in the illumination information, and at least one of the orientation of the display surface and the direction of the viewer's eye. The inclination of the portable terminal and the direction of the viewer's eye are detected by the inclination detection unit 110 and the viewer detection unit 118, respectively, and are held in a memory or the like so that the rendering unit 104 can access them.

At step S607, the portable terminal 100 (the rendering unit 104) renders the display data of the material based on the acquired illumination information, the calculated relative positional relationship, and the acquired material information (color characteristics, shape characteristics, reflection characteristics).

At step S609, the display unit 102 displays (redisplays) the image of the material using the display data.

At step S611, it is determined whether changing the material displayed on the display unit 102 to another material and applying it to the part of the virtual space is selected. If change of the material is not selected, the process returns to step S605.

If application of a material is selected, at step S613, the identifier of the part in the virtual space and the identifier of the selected material are transmitted. The identifier of the part of the virtual space and the identifier of the selected material thus transmitted are received by the virtual space image processing device 300 or the server 500. Further, at step S613, the display unit 102 can display an image of the other material selected at step S611 as in steps S601 to S609.

Note that step S601 may be executed after step S603. In particular, when using the illumination information acquired in the real environment, step S601 may be included in the loop from step S605 to S609 and the illumination information may be re-acquired each time the rendering unit 104 renders the display information.

In the above description, an embodiment in which a mobile terminal including an inclination detection device (one or more of a gyro sensor, an acceleration sensor, and a magnetic sensor) is used as the image processing apparatus 100 has been described. In this example, the rendering unit 104 generates the display data of the material as if the surface of the material is overlaid on the display surface, taking account of the inclination of the tablet terminal 100 (the orientation of the display surface). Thus, tilting the tablet terminal 100, the viewer holding the tablet terminal 100 can view the texture of the material as if the viewer is holding the material in his or her hand.

However, the image processing device 100 is not limited to a portable terminal including an inclination detection device (one or more of a gyro sensor, an acceleration sensor, and a magnetic sensor). For example, a portable terminal not equipped with an inclination detection device may be used as the image processing device 100. Further, a desktop or laptop computer not equipped with an inclination detection device may be used as the image processing device 100. The laptop computer includes a display device. The display device of the desktop computer may be a built-in type or an external type.

Again, referring to FIG. 4, an example where a portable terminal not equipped with an inclination detection device is used as the image processing device 100 is described. Note that the image processing device 100 is not limited to a portable terminal such as a tablet terminal, and may be a combination of a desktop computer not including an inclination detection device and a stationary display device. As shown in FIG. 4, the image processing device 100 includes a material tilting unit 120 as an alternative or addition to the inclination detection unit 110. Any of or a combination of a processor, a pointing device including a computer mouse, a display device, and other elements of the image processing device 100 constitutes the material tilting unit 120. The material tilting unit 120 tilts a material placed in the virtual space. The rendering unit (display data generating unit) 104 takes into account the inclination of the material when rendering the display data.

For example, the material tilting unit 120 calculates the virtual inclination of the material in the virtual space according to the movement distance and the movement direction of the pointing device (mouse pointer on the display surface), and transmits the calculated inclination of the material through the memory or directly to the rendering unit 104. In another example, the material tilting unit 120 calculates the inclination of the material in the virtual space according to the distance and direction of swiping on a touch display device (display surface), and transmits the calculated inclination of the material through the memory or directly to the rendering unit 104. The rendering unit 104 takes into consideration the inclination of the material in the virtual space when generating the display data.

Figure 12A:
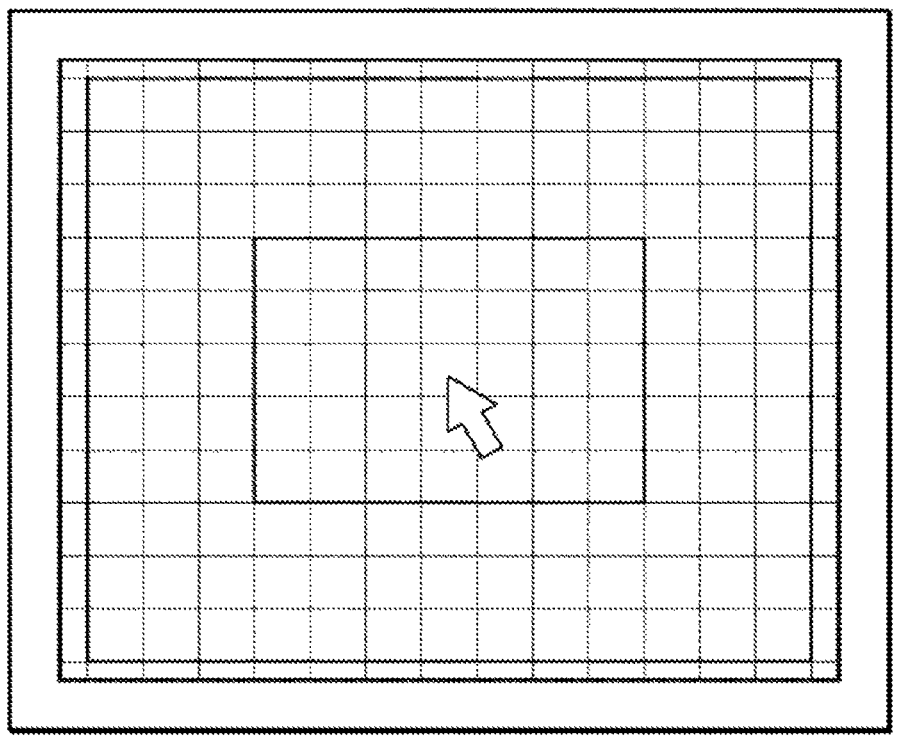
FIG. 12A is a diagram for describing the way of virtually imparting an inclination of an orientation of a display surface taken into consideration when an image processing system according to an embodiment of the present invention renders display data.

FIG. 12A is a drawing showing the initial state of an example case where the image processing device 100 is placed as shown in FIG. 7, in which a mouse pointer has been placed on the image of the displayed material. FIG. 12A is a drawing showing a state in which the material is displayed over the entire display area in the frame (bezel) of the display device. The area in which the material is displayed is not necessarily the entire display area of the display device, but may be, for example, a part of the display area of the display device such as the texture viewer area 408 described with reference to FIG. 3. Further, the pattern of the image of the material shown in FIG. 12A is an example for description. This pattern may be displayed overlaid on the image of the material as an inclination indicator that makes it easy for the viewer to recognize the orientation and amount of inclination of the material. If the pattern of the material itself makes it easy for the viewer to recognize the orientation and amount of inclination of the material, it is not necessary to add such a pattern. The position of the mouse pointer in the initial state may be any position and does not need to be the center of the displayed image of the material.

Figure 12B:
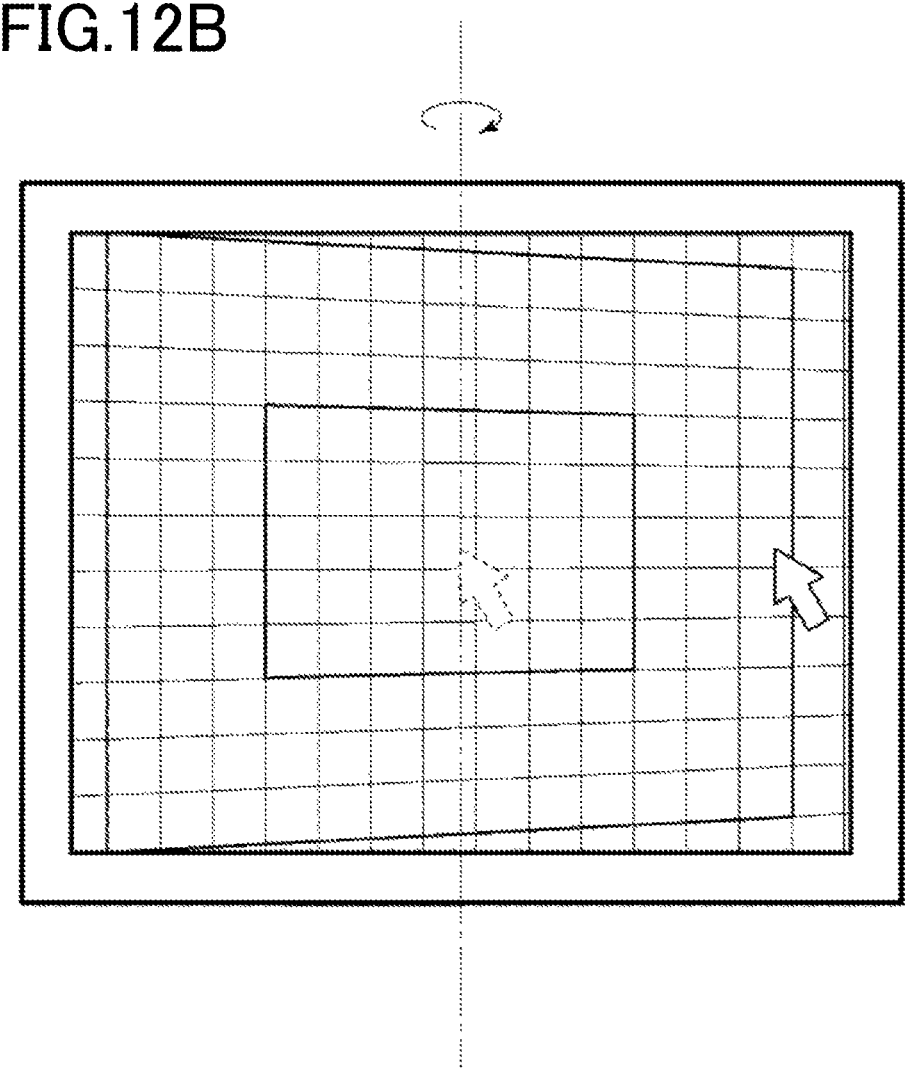
FIG. 12B is a diagram for describing the way of virtually imparting an inclination of an orientation of a display surface taken into consideration when an image processing system according to an embodiment of the present invention renders display data.

FIG. 12B shows a state in which the mouse pointer has been moved horizontally to the right from the initial position (FIG. 12A). The material tilting unit 120 calculates the inclination of the material in a rotational direction around the vertical axis passing through the center of the material in the virtual space according to the movement distance and the movement direction of the mouse pointer, and transmits the calculated inclination of the material to the rendering unit 104. The rendering unit 104 takes into consideration the inclination calculated by the material tilting unit 120 when generating the display data. For example, the rendering unit 104 adds, to the information indicating the orientation of the pixel surface stored in the material information storage unit 116 (the normal vector of the pixel of the material), the rotation corresponding to the inclination calculated by the material tilting unit 120 according to the movement distance and the movement direction of the mouse pointer, and generates the display data. In FIG. 12B, the material is displayed such that the right end of the displayed material has moved further from the page and the left end of the displayed material has moved closer to the page.

With respect to the material in the virtual space, the rendering unit 104 calculates the color components and intensity (luminance) reflected in the viewer's direction for each pixel taking into consideration the inclination calculated by the material tilting unit 120, and further, generates the display data by mapping the calculated color components and intensity (luminance) of each pixel to the pixels of the display device. As a result, as shown in FIGS. 12B to 12D, the rendering unit 104 can display an image of an inclined material.

Figure 12C:
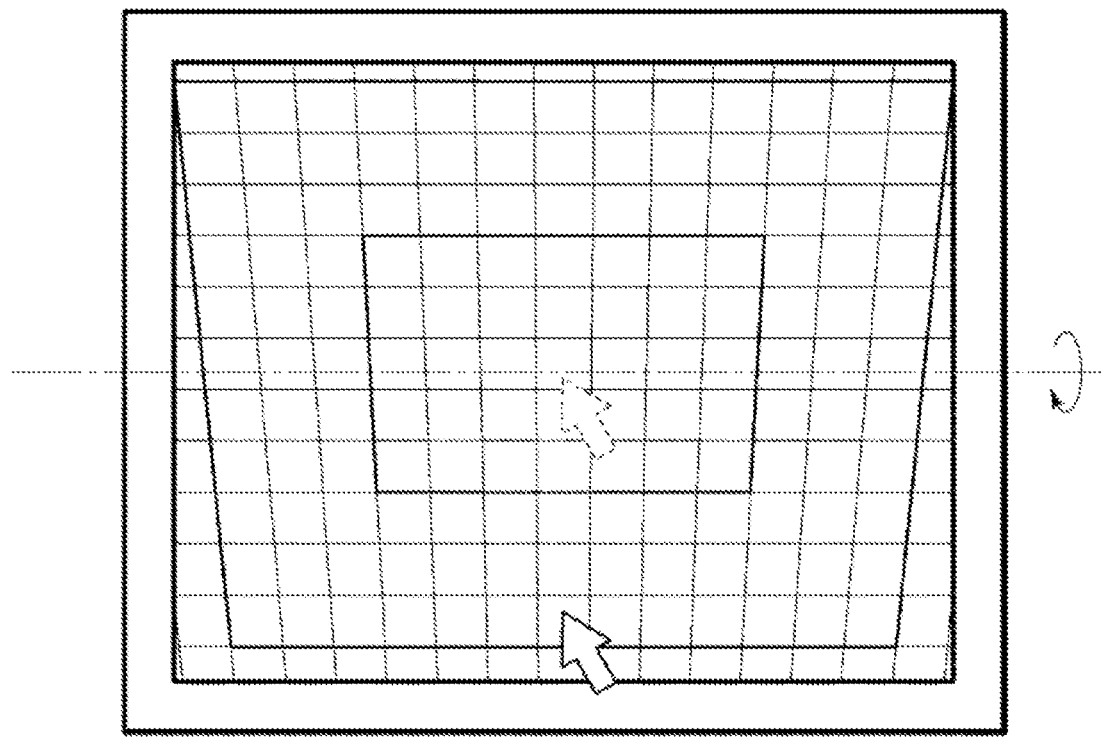
FIG. 12C is a diagram for describing the way of virtually imparting an inclination of an orientation of a display surface taken into consideration when an image processing system according to an embodiment of the present invention renders display data.

FIG. 12C shows a state in which the mouse pointer has been moved vertically down from the initial position (FIG. 12A). The material tilting unit 120 calculates the inclination of the material in a rotational direction around the horizontal axis passing through the center of the material in the virtual space according to the movement distance and the movement direction of the mouse pointer, and transmits the calculated inclination of the material to the rendering unit 104. The rendering unit 104 takes into consideration the inclination calculated by the material tilting unit 120 when generating the display data. In FIG. 12C, the material is displayed such that the lower end of the displayed material has moved further from the page and the upper end of the displayed material has moved closer to the page.

Figure 12D:
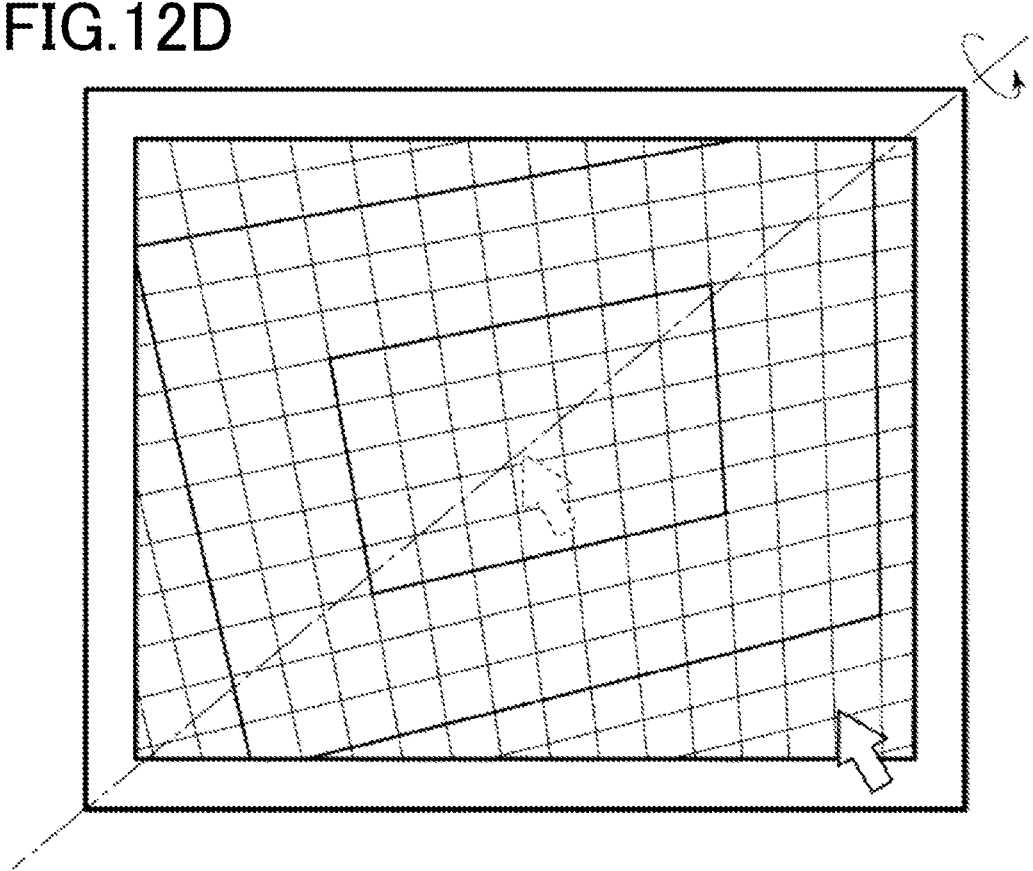
FIG. 12D is a diagram for describing the way of virtually imparting an inclination of an orientation of a display surface taken into consideration when an image processing system according to an embodiment of the present invention renders display data.

FIG. 12D shows a state in which the mouse pointer has been moved right and down from the initial position (FIG. 12A). The material tilting unit 120 calculates the inclination of the material in a rotational direction around a diagonal axis passing through the center of the material in the virtual space according to the movement distance and the movement direction of the mouse pointer, and transmits the calculated inclination of the material to the rendering unit 104. The rendering unit 104 takes into consideration the inclination calculated by the material tilting unit 120 when generating the display data. In FIG. 12D, the material is displayed such that the lower right corner of the displayed material has moved further from the page and the upper left corner of the displayed material has moved closer to the page.

As described with reference to FIGS. 12A to 12D, for example, in a state where the image processing device 100 is placed as shown in FIG. 7, the material tilting unit 120 can provide the inclination of the material in the virtual space to the rendering unit 104. Thus, in a state where the image processing device 100 is placed as shown in FIG. 7, the rendering unit 104 renders the display data taking into consideration the inclination of the material calculated by the material tilting unit 120, and the display unit 102 displays this. Therefore, the viewer can observe the texture of an inclined material by manipulating the pointing device.

As described above, the material tilting unit 120 can calculate a virtual inclination of the orientation of the display surface according to the movement distance and the movement direction of the pointing device or the distance and direction of swiping. However, the material tilting unit 120 may be configured such that it displays a user interface (UI) for prompting the viewer to input the inclination value (numerical value) of the material in the virtual space to obtain the inclination of the material via the UI.

Referring again to FIG. 4, an example where a portable terminal not equipped with an inclination detection device is used as the image processing device 100 is described. As described above, a desktop or laptop computer not equipped with an inclination detection device may be used as the image processing device 100. As shown in FIG. 4, the inclination of the material in the virtual space may be provided using a material tilting unit 122 as an alternative or addition to the inclination detection unit 110. The material tilting unit 122, which is separate from the image processing device 100, is connected to the image processing device 100 with a wireless or wired means and provides the inclination of the material in the virtual space. For example, the material tilting unit 122 may be a plate-shaped object including an inclination detection device (one or more of a gyro sensor, an acceleration sensor, and a magnetic sensor).

Assuming that the surface of the plate-shaped object is the surface of the material in the virtual space, when the orientation of the plate-shaped object including the inclination detection device is changed by the viewer, the inclination detected by the material tilting unit 122 is provided to the rendering unit 104 as the inclination of the surface of the material in the virtual space. The rendering unit 104 takes into consideration the inclination provided by the material tilting unit 122 when generating the display data. Therefore, tilting the material tilting unit 122 (plate-shaped object), the viewer holding the material tilting unit 122 (plate-shaped object) can observe the texture of the material through the displayed image as if he or she is holding the real material.

As described above, according to the present invention, an image processing system, method, and program are provided that enable the user to view a more detailed change in the appearance (texture) of the material placed in the space, that is, capable of displaying the texture of the material in accordance with a change in the observation environment or a change in the orientation of the material.

In the above description of the embodiments, a configuration in which the image processing system includes a portable terminal (tablet terminal) and a virtual space image processing terminal (computer) has been described. However, a functional unit of the virtual space image processing terminal may be implemented in the portable terminal to implement the present invention. Further, the present invention may be implemented by providing a server in the configuration of the image processing system, and implementing a part of the function of the virtual space image processing terminal in the server.

Conventional virtual showrooms could only show an image of the entire room to the person considering purchasing a house, and the texture of materials such as the wallpaper and floor material of the room could not be grasped. In addition, whether it is a paper medium or an electronic medium, there is a problem that a change in the appearance (texture) of the material in accordance with a change in the observation environment or a change in the orientation of the material cannot be expressed.

Thus, it is desired to provide a system that enables the user to view a more detailed change in the appearance (texture) of the material placed in the space, that is, enables the user to experience a simulation of the change in the appearance (texture) of the material in accordance with a change in the observation environment or a change in the orientation of the material.

The present invention has an aspect to provide an image processing system, method, and program that enable the user to view a more detailed change in the appearance (texture) of the material placed in the space, that is, capable of displaying the texture of the material in accordance with a change in the observation environment or a change in the orientation of the material.

A first aspect of the present invention is an image processing system. This system includes means for displaying a space including one or more materials, means for displaying an image of each of the one or more materials, means for specifying each of the one of more materials in the space, and means for specifying illumination information and material information associated with the specified material. The means for displaying the image of each of the one or more materials displays the image of the material based on the specified illumination information, material information, and the relative positional relationship of a light fixture, a display surface of the means for displaying the image of the material, and a viewer.

A second aspect of the present invention is an image processing method. This method is an image processing method carried out by an image processing system including a first display means and a second display means. The first display means displays a space including one or more materials, specifies each of the one or more materials in the space, and specifies illumination information and material information associated with the specified material. The second display means displays an image of the material based on the specified illumination information, material information, and the relative positional relationship of a light fixture, a display surface of the means for displaying the image of the material, and a viewer.

A third aspect of the present invention is an image processing program. This program causes a computer to function as the image processing system of the first aspect.

As described above, according to the present invention, an image processing system, method, and program capable of displaying the texture of a material in accordance with a change in the observation environment or a change in the orientation of the material can be provided.

REFERENCE SIGNS LIST

100 Portable Terminal
102 Display unit (pressure-sensitive display)
104, 304 Rendering unit (display data generation unit)
106 Ambient illumination information storage unit
108 Ambient illumination information acquisition unit (photometric device, illuminance sensor, camera)
110 Inclination detection unit (gyro sensor, acceleration sensor, magnetic sensor)
112, 312 Input unit (keyboard, keypad, mouse, pointing device, microphone)
114, 314 Communication unit (network IF card (NIC), wireless device)
116, 316 Material information storage unit
118 Viewer detection unit (infrared sensor, camera)
120, 122 Material tilting unit
202, 204 Electric lamp
206 Sun
208 Eye 300 Computer
302 Display unit (monitor)
306 Spatial illumination information storage unit
308 Spatial information storage unit
318 In-space viewer position detection unit Obviously, numerous modifications and variations of the present invention are possible in light of the above teachings. It is therefore to be understood that within the scope of the appended claims, the invention may be practiced otherwise than as specifically described herein.

What is claimed is:

1. An image processing system, comprising:
   processing circuitry configured to
   control display of an image of a physical space on a display,
   control virtual overlay of a selected material of a plurality of materials to a physical object in the display of the image of the physical space such that a material of the physical object is replaced with the selected material in the image of the physical space, and
   control further application of material information that is associated with the selected material and illumination information to the virtual overlay of the selected material to the physical object in the image of the physical space,
   wherein the processing circuitry is configured to control display of the image of the physical space including the virtual overlay of the selected material based on the illumination information, the material information, and a relative positional relationship of: a light fixture, a display surface of the display, and a user who is a viewer.

2. The system of claim 1, wherein the processing circuitry is configured to control specifying of an orientation of the display surface of the display, and to control display of the image of the physical space including the virtual overlay of the selected material based on the illumination information, the material information, and the orientation.

3. The system of claim 1, wherein the processing circuitry is configured to control inclination of the selected material in a virtual space and to control display of the image of the physical space including the virtual overlay of the selected material based on the illumination information, the material information, and the inclination of the selected material in the virtual space.

4. The system of claim 3, wherein the processing circuitry is configured to control specifying of a position of an eye of the viewer of the display, and to control display of the image of the physical space including the virtual overlay of the selected material based on the illumination information, the material information, the position of the eye, and an orientation or an inclination of the selected material in the virtual space.

5. The system of claim 1, wherein the processing circuitry is configured to control acquisition of ambient illumination information of the display, and the illumination information comprises the ambient illumination information acquired.

6. The system of claim 1, wherein the illumination information comprises illumination information of the physical space.

7. The system of claim 1, wherein the processing circuitry is configured to control changing of the selected material to a different selected material.

8. The system of claim 1, further comprising:
   second processing circuitry configured to control display of the image of the physical space including the selected material on a second display.

9. The system of claim 1, wherein the physical space is a room within a building.

10. The system of claim 1, wherein the displaying the image of the physical space including the virtual overlay of the selected material on the display is updated in response to a change in the relative positional relationship of: the light fixture, the display surface of the display, and the user who is the viewer.

11. The system of claim 1, wherein the displaying the image of the physical space including the virtual overlay of the selected material on the display is updated such that when a degree of inclination is such that light from the light fixture does not enter the display surface the display is updated on this basis.

12. The system of claim 1, wherein the displaying the image of the physical space including the virtual overlay of the selected material on the display is updated based on a next relative position and information corresponding to a specific pixel,
   wherein the next relative position is determined based on a position where the specific pixel is displayed on the display, the light fixture, and the user who is the viewer, and
   wherein the information corresponding to the specific pixel is determined based on normal line information, RGB information, and gloss sharpness information.

13. A method of processing an image, comprising:
   displaying an image of a physical space on a display;
   virtually overlaying a selected material of a plurality of materials to a physical object in the displaying of the image of the physical space such that a material of the physical object is replaced with the selected material in the image of the physical space;
   further applying of material information that is associated with the selected material and illumination information to the virtual overlay of the selected material to the physical object in the image of the physical space; and
   displaying the image of the physical space including the virtual overlay of the selected material on the display based on the illumination information, the material information, and a relative positional relationship of: a light fixture, a display surface of the display, and a user who is a viewer.

14. The method of claim 13, further comprising:
   specifying an orientation of the display surface of the display,
   wherein the image of the physical space including the virtual overlay of the selected material is displayed based on the illumination information, the material information, and the orientation.

15. The method of claim 13, further comprising:
   controlling inclination of the selected material in a virtual space,
   wherein the image of the physical space including the virtual overlay of the selected material is displayed based on the illumination information, the material information, and the inclination of the selected material in the virtual space.

16. The method of claim 15, further comprising:
   specifying a position of an eye of the viewer of the display,
   wherein the image of the physical space including the virtual overlay of the selected material is displayed based on the illumination information, the material information, the position of the eye, and an orientation or an inclination of the selected material in the virtual space.

17. The method of claim 13, further comprising:
acquiring ambient illumination information of the display, wherein the illumination information comprises the ambient illumination information.

18. The method of claim 13, wherein the illumination information comprises illumination information of the physical space.

19. The method of claim 13, wherein the displaying of the image of the physical space further comprises changing the selected material to a selected different material.

20. A non-transitory computer-readable medium including computer executable instructions, wherein the instructions, when executed by a computer, cause the computer to perform a method of processing an image, comprising:
displaying an image of a physical space on a display;
virtually overlaying a selected material of a plurality of materials to a physical object in the displaying of the image of the physical space such that a material of the physical object is replaced with the selected material in the image of the physical space;
further applying of material information that is associated with the selected material and illumination information to the virtual overlay of the selected material to the physical object in the image of the physical space; and
displaying the image of the physical space including the virtual overlay of the selected material on the display based on the illumination information, the material information, and a relative positional relationship of: a light fixture, a display surface of the display, and a user who is a viewer.

\* \* \* \* \*